US008752063B2

(12) United States Patent
Ertugay et al.

(10) Patent No.: US 8,752,063 B2
(45) Date of Patent: Jun. 10, 2014

(54) PROGRAMMING INTERFACE FOR DATA COMMUNICATIONS

(75) Inventors: Osman N. Ertugay, Bellevue, WA (US); Keith E. Horton, Sammamish, WA (US); Joseph Nievelt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 13/167,311

(22) Filed: Jun. 23, 2011

(65) Prior Publication Data

US 2012/0331480 A1     Dec. 27, 2012

(51) Int. Cl.
G06F 3/00 (2006.01)
G06F 9/44 (2006.01)
G06F 9/46 (2006.01)
G06F 13/00 (2006.01)

(52) U.S. Cl.
USPC ......................................................... 719/312

(58) Field of Classification Search
USPC ......................................................... 719/312
See application file for complete search history.

(56) References Cited

U.S. PATENT DOCUMENTS

| | | | |
|---|---|---|---|
| 6,175,879 B1 * | 1/2001 | Shah et al. ..................... | 719/330 |
| 6,223,207 B1 | 4/2001 | Lucovsky et al. | |
| 6,442,612 B1 | 8/2002 | Hugosson et al. | |
| 7,219,157 B2 | 5/2007 | Blott et al. | |
| 7,281,046 B1 | 10/2007 | Sunderasan et al. | |
| 2001/0047438 A1 * | 11/2001 | Forin .............................. | 710/18 |
| 2004/0019882 A1 | 1/2004 | Haydt | |
| 2006/0236063 A1 * | 10/2006 | Hausauer et al. ............. | 711/170 |
| 2008/0155154 A1 | 6/2008 | Kenan et al. | |
| 2009/0217294 A1 | 8/2009 | Dixon et al. | |
| 2010/0169897 A1 | 7/2010 | Cox | |

OTHER PUBLICATIONS

Jones et al., "Windows Sockets 2.0: Write Scalable Winsock Apps Using Completion Ports", Oct. 2000, MSDN Magazine, pp. 1-6.*
"International Search Report", Mail Date: Jan. 7, 2013, Application No. PCT/US2012/042109, Filed date: Jun. 13, 2012, pp. -9.
Bernardo, et al., "Protecting Next Generation High Speed Network Protocol—UDT through Generic Security Service Application Program Interface—GSS-API", Retrieved at <<http://ieeexplore.ieee.org/stamp/stamp.jsp?tp=&arnumber=5633783>>, Proceedings of Fourth International Conference on Emerging Security Information, Systems and Technologies, 2010, pp. 266-272.

(Continued)

*Primary Examiner* — Andy Ho
*Assistant Examiner* — Timothy A Mudrick
(74) *Attorney, Agent, or Firm* — Andrew Sanders; Micky Minhas

(57) ABSTRACT

In embodiments of a programming interface for data communications, a request queue and a completion queue can be allocated from a user-mode virtual memory buffer that corresponds to an application. The request queue and the completion queue can be pinned to physical memory and then mapped to kernel-mode system addresses so that the request queue and the completion queue can be accessed by a kernel-mode execution thread. A request can be received from an application for the kernel to handle data in the request queue, and a system issued to the kernel for the kernel-mode execution thread to handle the request. The kernel-mode execution thread can then handle additional requests from the application without additional system calls being issued.

16 Claims, 5 Drawing Sheets

(56) References Cited

OTHER PUBLICATIONS

Goglin, et al., "An efficient network API for in-kernel applications in clusters", Retrieved at <<http://ieeexplore.ieee.org/stamp/stamp.jsp?tp=&arnumber=4154087>>, IEEE International Conference on Cluster Computing, Apr. 16, 2007, pp. 10.

"RDMA model", Retrieved at <<http://www.zurich.ibm.com/sys/rdma/model.html>>, Retrieved Date: Feb. 3, 2011, pp. 3.

Corbet., "OLS: A proposal for a new networking API", Retrieved at <<http://lwn.net/Articles/192410/su>>, Jul. 22, 2006, pp. 7.

* cited by examiner

PROGRAMMING INTERFACE FOR DATA COMMUNICATIONS

BACKGROUND

Current application programming interfaces (APIs), that interface high-performance networking applications with the kernel of a computing device, are not well equipped to handle the increased data processing demands of networking applications. For example, the "Windows Socket" API, known as "Winsock", is configured to facilitate operations issued by applications to send and receive data to and from the kernel layer which communicates with a physical network device. Send and receive operations are generally issued multiple times over the course of the socket's lifetime. Accordingly, the send and receive processing overhead can constitute the majority of the network processing and perhaps of the application as a whole.

In the traditional Winsock API, for example, initiating the send and receive operations involve making a system call to pin user-mode virtual memory to physical memory and to initiate the transfer of data into the kernel. Then an additional system call is typically required to get the completion status of the transfer and to unpin the user-mode virtual memory from the physical memory. Accordingly, existing Winsock send and receive APIs may incur redundant memory pinning and unpinning if the application uses the same memory over and over again for sending and receiving data.

SUMMARY

This Summary is provided to introduce simplified concepts of a programming interface for data communications, and the concepts are further described below in the Detailed Description and/or shown in the Figures. This Summary should not be considered to describe essential features of the claimed subject matter, nor used to determine or limit the scope of the claimed subject matter.

A programming interface for data communications is described. In embodiments, a request queue can be allocated from a user-mode virtual memory buffer that corresponds to an application. The request queue can be pinned to physical memory and then mapped to a kernel-mode system address so that the request queue can be accessed by a kernel-mode execution thread. A request can be received from an application for the kernel to handle data in the request queue, and a system call issued to the kernel for the kernel-mode execution thread to handle the request. The kernel-mode execution thread can then handle additional requests from the application without additional system calls being issued. For example, I/O requests will be one system call, but will not require any memory pinning overhead, and the I/O completion will occur without any system call overhead. A socket can be registered that provides a data request from the application to the kernel. In embodiments, registering the socket includes identifying a completion queue to the socket, allocating the request queue from the user-mode virtual memory buffer, and pinning the request queue to the physical memory.

In other embodiments, a user-mode virtual memory buffer is registered as corresponding to an application. A completion queue is allocated from the user-mode virtual memory buffer and pinned to physical memory. The completion queue is then mapped to a kernel-mode system address in a kernel. The completion queue receives completion notifications from a kernel-mode execution thread via the kernel-mode system address, and enables access to the completion notifications by the application via the user-mode virtual memory buffer without the overhead of any kernel to user system calls.

BRIEF DESCRIPTION OF THE DRAWINGS

Embodiments of a programming interface for data communications are described with reference to the following Figures. The same numbers are used throughout to reference like features and components that are shown in the Figures.

DETAILED DESCRIPTION

Figure 1:
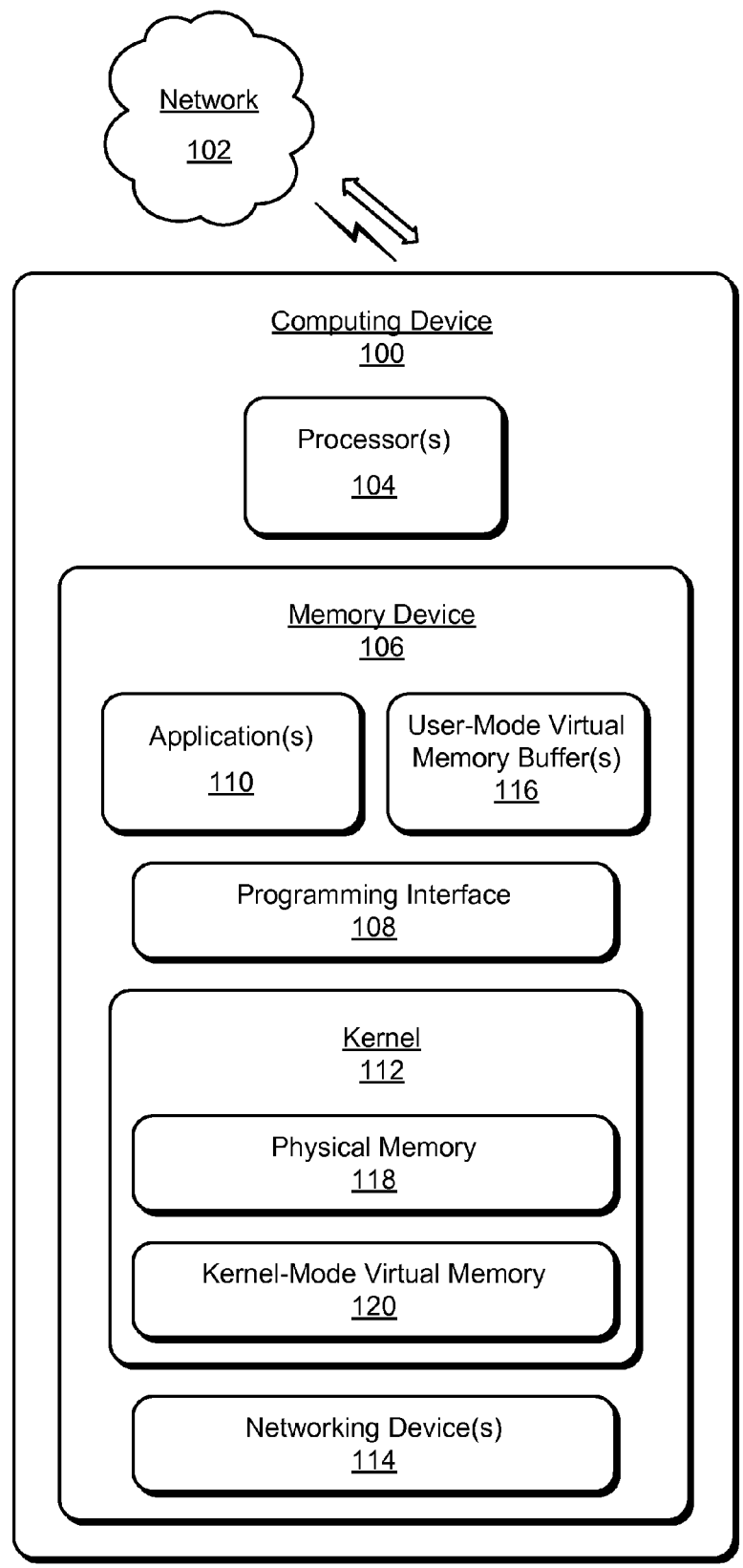
FIG. 1 illustrates an example computing device in which embodiments of a programming interface for data communications can be implemented.

A programming interface for data communications is described. A "communication stack" can be implemented in software in a computing device to communicate data via a network. A typical communication stack includes an application layer where networking applications are implemented and a kernel layer where the operating system kernel is implemented. The application layer exposes an interface to applications that is abstracted away from the underlying details of the communication stack. The kernel layer interfaces with networking devices configured to communicate data over the network.

Typically, to send data over a network, an application pushes data through a user-mode application programming interface (API) which is then processed by the networking stack to frame the protocol in both the user-mode and the kernel-mode. As described herein, user-mode refers to an execution mode where access to system resources such as physical memory and I/O devices is protected by the operating system in order to provide isolation between multiple applications running on the same system. Kernel-mode, as described herein, refers to an execution mode which provides access to all system resources but only allows certain parts of operating system code to run in the kernel-mode. The data is then moved to a networking device, such as a network interface card (NIC), in the kernel layer which facilitates communication of the data over the network. An NIC is a hardware device that is used by the system for sending and receiving data over a network.

It should be noted, therefore, that in order for an application to communicate data over a network, the application must first transmit data from the application layer to the kernel layer. A programming interface (such as "Windows Socket", known as "Winsock", by Microsoft Corporation) is configured to interface the application layer with the kernel layer and can be used to facilitate the transfer of data between the application layer and the kernel layer.

In the traditional Winsock API, initiating send and receive operations involve making a system call to pin user-mode virtual memory to physical memory and to initiate the transfer of data into the kernel. As described herein, a "system call" refers to a mechanism for user-mode code to issue a request to the system code running in kernel-mode. This is how user-mode applications gain access to and use system resources in a protected fashion. In addition, an additional system call is typically used to get the completion status of the transfer and to then unpin the user-mode virtual memory from the physical memory. Accordingly, existing Winsock send and receive APIs may incur redundant memory pinning and unpinning if the application uses the same memory over and over again for sending and receiving data.

The high frequency of system calls to the kernel often creates a heavy processing load on the kernel which may not be equipped to handle a high volume of networking data processing requests, and particularly for the high-speed data processing demands of networking applications. Accordingly, communication delays, also known as latency, often result from the communication of data between the application layer and the kernel layer. In addition, networking applications may experience jitter, the variation in latency, during data communications.

In embodiments, a programming interface that is compatible with existing communication stacks, applications, and network protocols is described. Prior attempts at enabling high-speed data communications have attempted to modify the whole communication stack. It should be appreciated then, that the programming interface described herein can be implemented as a modification of existing programming interfaces, and does not affect the communication stack. Embodiments of the programming interface improves processor load, reduces the latency of network communication, and reduces jitter by reducing the number of system calls to the kernel.

The programming interface separates the pinning and unpinning of user-mode virtual memory buffers to physical memory from data transfer request initiation and completion handling. A user-mode application, therefore, can register a user-mode virtual memory buffer once (which would involve pinning of the memory buffer to the physical memory location), and can then use the registered user-mode virtual memory buffer for multiple data transfer requests without re-registering or unpinning the memory buffer. By separating the pinning and unpinning of memory from data transfer initiation and completion, the programming interface enables data transfer initiation and completion handling without making multiple system calls.

In embodiments, the programming interface uses a request queue for request initiation and a completion queue for retrieving request completions. The request queue and the completion queue can be allocated from a user-mode virtual memory buffer corresponding to the application and pinned in physical memory. The request queue and the completion queue can then be mapped to kernel-mode system addresses to enable the request queue and the completion queue to be accessed by a kernel-mode execution thread.

This configuration enables a user-mode application to continuously queue requests into the request queue while the kernel-mode execution thread (such as a system thread or interrupt) continuously drains the requests from the request queue to handle the requests. As requests are completed in the kernel-mode, completion notifications can be queued to the completion queue by a kernel-mode execution thread. These completion notifications can then be de-queued by the user-mode application directly from the completion queue. Note then that the programming interface only needs to issue a system call when there are no kernel-mode execution threads already assigned to handle the queued request from the request queue.

While features and concepts of a programming interface for data communications can be implemented in any number of different devices, systems, environments, networks, and/or configurations, embodiments of a programming interface for data communications are described in the context of the following example devices, systems, and methods.

FIG. 1 illustrates an example computing device 100 in which various embodiments of a programming interface for data communications can be implemented. The example computing device 100 may be configured as any type of computing device or server, and may be implemented with any number and combination of differing components as further described with reference to the example device shown in FIG. 5. For example, a computing device 100 can be implemented as any one or combination of a server, a television client device, a computer device, a gaming system, an appliance device, an electronic device, and/or as any other type of device that may be implemented to send and receive data over a network. Accordingly, the computing device 100 may also be implemented as a wireless device implemented to receive and/or communicate wireless data, such as any one or combination of a mobile phone (e.g., cellular, VoIP, WiFi, etc.), a portable computer device, a media player device, and/or any other wireless device that can send and receive data.

Computing device 100 can communicate data via a network 102, which can be implemented to include a wired and/or a wireless network that facilitates data communication. The network can also be implemented using any type of network topology and/or communication protocol, and can be represented or otherwise implemented as a combination of two or more networks. The network may also include mobile operator networks that are managed by mobile operators, such as a communication service provider, cell-phone provider, and/or Internet service provider. A mobile operator can facilitate mobile data and/or voice communication for any type of a wireless device or mobile phone (e.g., cellular, VoIP, Wi-Fi, etc.).

Computing device 100 can include one or more processors 104 (e.g., any of microprocessors, controllers, and the like) which process various computer-executable instructions to control the operation of the device. The device also includes one or more memory devices 106 (e.g., computer-readable storage media) that enable data storage. A memory device can be implemented as any type of memory, storage media, and/or suitable electronic data storage.

Computing device 100 can also include a programming interface 108 that is configured to interface various applications 110 (e.g., networking applications) with the underlying details of a communication stack. The applications can be implemented to send and receive data via the network. The programming interface 108 is also configured to interface a kernel 112 (e.g., the operating system kernel) with networking devices 114, such as a network interface card, to communicate data over the network. The programming interface can be implemented as computer-executable instructions, such as a software application, and executed by the one or more processors of the computing device to implement the various embodiments described herein.

In an embodiment, the programming interface 108 is implemented to receive a registration request, such as from an application 110, to communicate data over the network 102. In order to communicate data over the network, the data is handled by the kernel 112, which is implemented to facilitate communication of the data to the networking devices 114 for communication over the network. The programming interface 108 is implemented to receive the registration request and then register a user-mode virtual memory buffer 116 that corresponds to an application 110, by registering both a user-mode virtual address and a length. Registering the user-mode virtual memory buffer can also include sending a registration identifier to the application that can be used by the application during data transfer requests.

The programming interface 108 is also implemented to allocate a completion queue from the user-mode virtual memory buffer 116. The completion queue is allocated large enough to hold the number of completion entries specified by the application 110 in the registration request. After allocating the completion queue, the programming interface can pin the completion queue to physical memory 118 and map the completion queue to a kernel-mode system address (e.g., in the virtual memory space) in the kernel 112.

By mapping the same region of physical memory 118 to both the user-mode virtual memory buffer 116 and to the kernel-mode system address, the programming interface 108 enables simultaneous access to the completion queue by the application 110 and by the kernel 112. The completion queue can receive completion notifications from a kernel-mode execution thread initiated by the kernel 112 via the kernel-mode system address, and enable access to the completion notifications by the application 110 via the user-mode virtual memory buffer. The completion queue can be implemented as a circular FIFO queue, which enables the kernel to post completions to the completion queue that can then be retrieved by the application.

The programming interface 108 can also register a socket that provides data requests from the application 110 to the kernel 112. In an embodiment, the programming interface registers an existing socket, such as a Winsock API. Registering the socket includes allocating a request queue from the user-mode virtual memory buffer 116. The request queue is allocated large enough to hold the number of request entries specified by the application. Registering the socket also includes pinning the request queue to the physical memory 118, and mapping the request queue to a kernel-mode system address. By mapping the same region of physical memory to both the user-mode virtual memory buffers and to the kernel-mode system address, the programming interface enables simultaneous access to the request queue by the application 110 and by the kernel 112.

The request queue can receive data from the application via the user-mode virtual memory buffer, and enables access to the data by the kernel-mode execution thread via the kernel-mode system address. The request queue can also be implemented as a circular FIFO queue, which enables the application to post requests in the request queue that can then be retrieved by the kernel. As part of the registration process, the programming interface is also implemented to identify the completion queue to the socket, such as by passing a location and a length of the completion queue to the socket.

Figure 2:
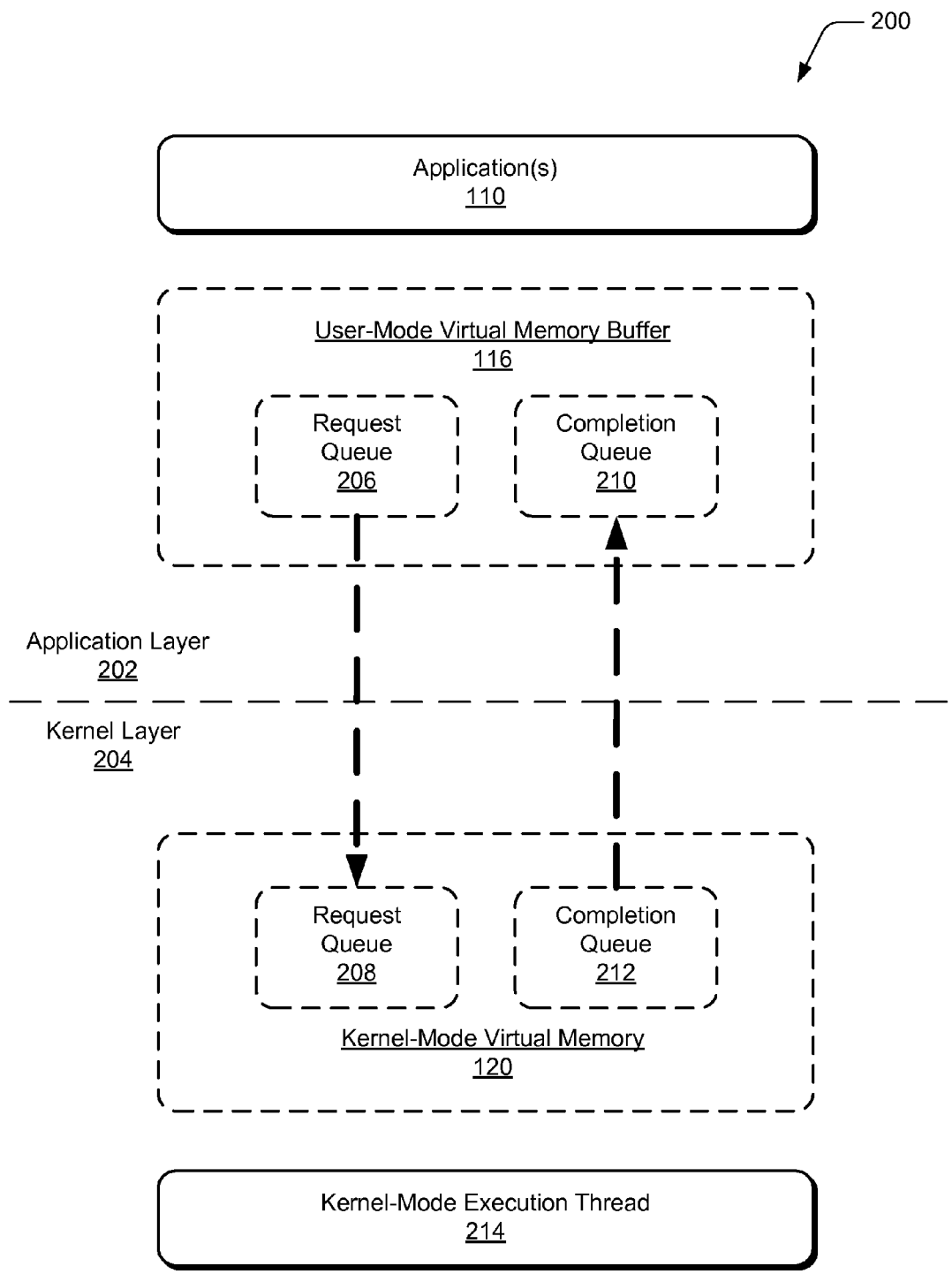
FIG. 2 illustrates an example of data requests to the kernel in accordance with one or more embodiments.

FIG. 2 illustrates an example 200 of data requests to the kernel, in accordance with embodiments of a programming interface for data communications. The example 200 includes an application 110, a user-mode virtual memory buffer 116, and kernel-mode virtual memory 120 all described with reference to FIG. 1. As illustrated in FIG. 2, the application 110 and the user-mode virtual memory buffer 116 are located in an application layer 202, and the kernel-mode virtual memory 120 is located in a kernel layer 204.

In this example, and in accordance with the discussion above, the programming interface 108 has already registered a socket that can provide data requests from the application to the kernel. For example, the programming interface can allocate a request queue 206 from the user-mode virtual memory buffer 116 and map the request queue to a corresponding request queue 208 in the kernel-mode virtual memory 120 (e.g., at a kernel-mode system address). In addition, the programming interface can allocate a completion queue 210 from the user-mode virtual memory buffer and map this completion queue to a corresponding completion queue 212 in the kernel-mode virtual memory (e.g., at a kernel-mode system address).

In an embodiment, the programming interface 108 is implemented to receive a request from application 110 for the kernel to handle data in the request queue 206. The request can be generated by the application by placing data in the request queue 206 and then identifying the request queue 206 to the programming interface, such as by including the registration identifier of the request queue 206 which was previously sent to the application by the programming interface.

The programming interface 108 is implemented to determine whether a kernel-mode execution thread 214, such as a system thread or an interrupt, is assigned to handle the request. The programming interface can issue a system call to the kernel for the kernel-mode execution thread 214 to handle the request. Once the kernel-mode execution thread is initiated to handle the request, the application can continuously queue requests into the request queue while the kernel-mode execution thread obtains the requests from the request queue to handle the requests. Therefore, if a kernel-mode execution thread has already been assigned to handle requests placed in the request queue, then the programming interface does not need to issue subsequent system calls because the kernel-mode execution thread is implemented to automatically handle the requests.

The kernel-mode execution thread 214 is implemented to handle a request by retrieving the data from the request queue 208 via the kernel-mode system address (e.g., in the virtual memory space). For example, as indicated by the arrows in FIG. 2, data placed in the request queue 206 by the application 110 is mapped to the request queue 208 in the kernel-mode virtual memory 120 where it can be retrieved and handled by the kernel-mode execution thread. After handling the data, the kernel-mode execution thread 214 is implemented to post a completion notification in completion queue 212 in the kernel-mode virtual memory 120. For example, the kernel-mode execution thread can post a completion notification after handling the data by processing the request and providing the request to a networking device (such as a network interface card) which facilitates communication of the data over the network.

Application 110 is implemented to monitor the completion queue 210 via the user-mode virtual memory buffer 116 to detect the completion notification posted by the kernel-mode execution thread. For example, as indicated by the arrows in FIG. 2, a completion notification placed in the completion queue 212 by the kernel-mode execution thread is mapped to the completion queue 210 in the user-mode virtual memory buffer 116 where it can be detected by application 110. The completion notification indicates to the application that the request has been handled by the kernel-mode execution thread. After detecting the completion notification, the application can then de-queue the completion notification from the completion queue and re-use the request queue 206 (that was just in use by the recently completed request) for an additional request. In an embodiment, the kernel-mode execution thread is implemented to send a signal directly to the application after handling the request if the application has previously requested that a signal be sent after the request is handled.

In an embodiment, the programming interface 108 is implemented to receive an additional request from the application 110 for the kernel to handle additional data in the request queue 206. For example, after the application detects the completion notification, the application can place additional data into the request queue. In this instance, the kernel-mode execution thread 214 is already assigned to handle the request, and the kernel-mode execution thread can then handle the additional request without an additional system call being issued to the kernel.

In an embodiment, the programming interface can be implemented to check on data that has been placed in the request and completion queues to avoid system-level corruption (e.g., avoid corrupting other applications or a system state). For example, note that when user-mode application code accesses the request or completion queues directly, it may have the ability to corrupt the integrity of the queues by changing the content of the queues. Accordingly, by performing checks, the programming interface ensures that a user-mode application can at most corrupt its own integrity, but can not impact the integrity of other applications or the integrity of the system.

Example methods 300 and 400 are described with reference to respective FIGS. 3 and 4 in accordance with one or more embodiments of a programming interface for data communications. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example method(s) may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
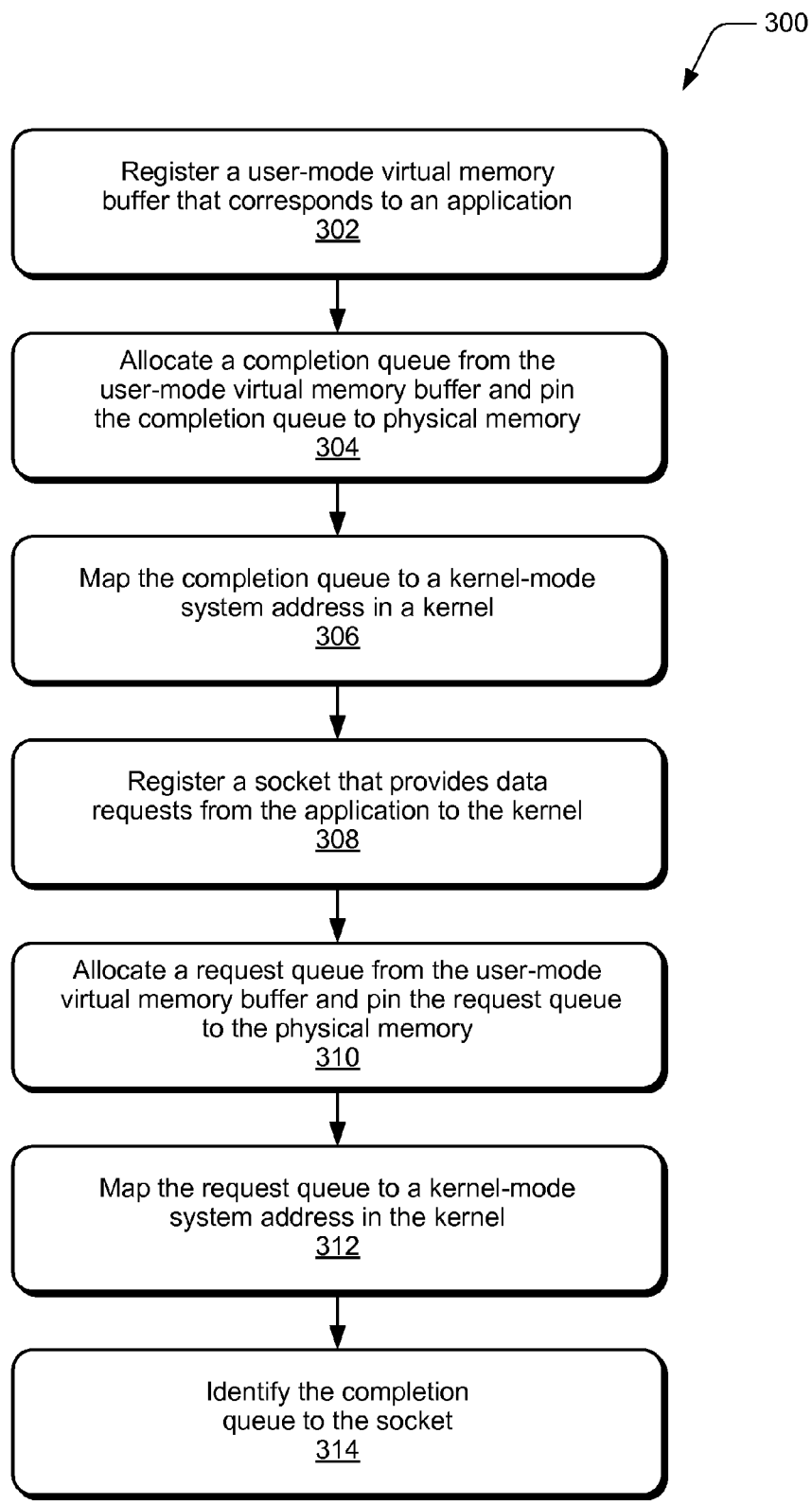
FIG. 3 illustrates example method(s) of a programming interface for data communications in accordance with one or more embodiments.

FIG. 3 illustrates example method(s) 300 of a programming interface for data communications, and is described with reference to programming interface 108 shown in FIGS. 1 and 2. The order in which the method blocks are described are not intended to be construed as a limitation, and any number of the described method blocks can be combined in any order to implement a method, or an alternate method.

At block 302, a user-mode virtual memory buffer that corresponds to an application is registered. For example, the programming interface 108 (FIG. 1) registers a user-mode virtual memory buffer 116 that corresponds to an application 110. At block 304, a completion queue is allocated from the user-mode virtual memory buffer and the completion queue is pinned to physical memory. For example, the programming interface 108 allocates a completion queue 210 (FIG. 2) from the user-mode virtual memory buffer 116 and pins the completion queue to physical memory 118.

At block 306, the completion queue is mapped to a kernel-mode system address in a kernel. For example, the programming interface 108 maps the completion queue 210 to a kernel-mode system address in the kernel 112. The completion queue can receive completion notifications from the kernel-mode execution thread 214 via the kernel-mode system address and enable access to the completion notifications by the application via the user-mode virtual memory buffer. At block 308, a socket is registered that provides data requests from the application to the kernel. For example, the programming interface 108 registers a socket that provides data requests from the application 110 to the kernel 112. In embodiments, registering the socket can include the features described at blocks 310, 312, and 314.

At block 310, a request queue is allocated from the user-mode virtual memory buffer and pinned to the physical memory. For example, the programming interface 108 allocates the request queue 206 from the user-mode virtual memory buffer 116 and pins the request queue to the physical memory 118. At block 312, the request queue is mapped to a kernel-mode system address in the kernel. For example, the programming interface 108 maps the request queue 206 to a kernel-mode system address in the kernel 112. The request queue is implemented to receive data from the application via the user-mode virtual memory buffer and to enable access to the data by the kernel-mode execution thread via the kernel-mode system address. At block 314, the completion queue is identified to the socket. For example, the programming interface 108 identifies the completion queue 210 to the socket.

Figure 4:
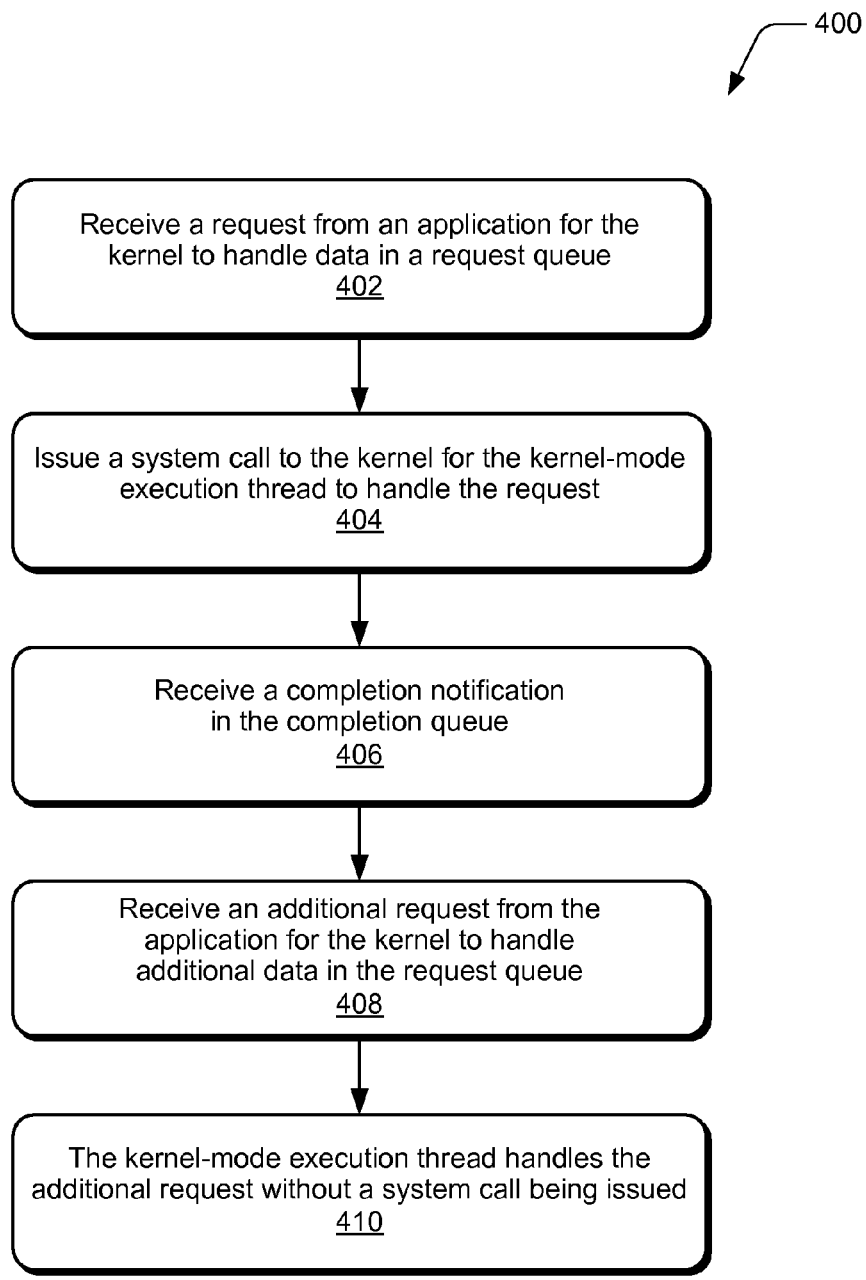
FIG. 4 illustrates additional example method(s) of a programming interface for data communications in accordance with one or more embodiments.

FIG. 4 illustrates example method(s) 400 of a programming interface for data communications, and is described with reference to programming interface 108 shown in FIGS. 1 and 2. In embodiments, the example method blocks described with reference to FIG. 4 can begin after the method blocks of FIG. 3 have been completed (e.g., after the completion queue is identified to the socket at block 314). The order in which the method blocks are described are not intended to be construed as a limitation, and any number of the described method blocks can be combined in any order to implement a method, or an alternate method.

At block 402, a request is received from an application for the kernel to handle data in a request queue. For example, the programming interface 108 (FIG. 1) receives a request from an application 110 for the kernel 112 to handle data in the request queue. The request can include a registration identifier. At block 404, a system call is issued to the kernel for the kernel-mode execution thread to handle the request. For example, the programming interface 108 issues a system call to the kernel 112 for the kernel-mode execution thread 214 to handle the request.

At block 406, a completion notification is received in the completion queue. For example, a completion notification can be posted in the completion queue 210 by the kernel-mode execution thread 214 via the kernel-mode virtual memory buffer 120 when the request from the application is handled.

At block 408, an additional request is received from the application for the kernel to handle additional data in the request queue, and at block 410, the kernel-mode execution thread handles the additional request without a system call being issued. For example, the programming interface 108 receives an additional request from the application 110 for the kernel 112 to handle additional data in the request queue 206, and the kernel-mode execution thread 214 is assigned to handle the additional request. The kernel-mode execution thread is implemented to handle additional requests without an additional system call being issued to the kernel.

Figure 5:
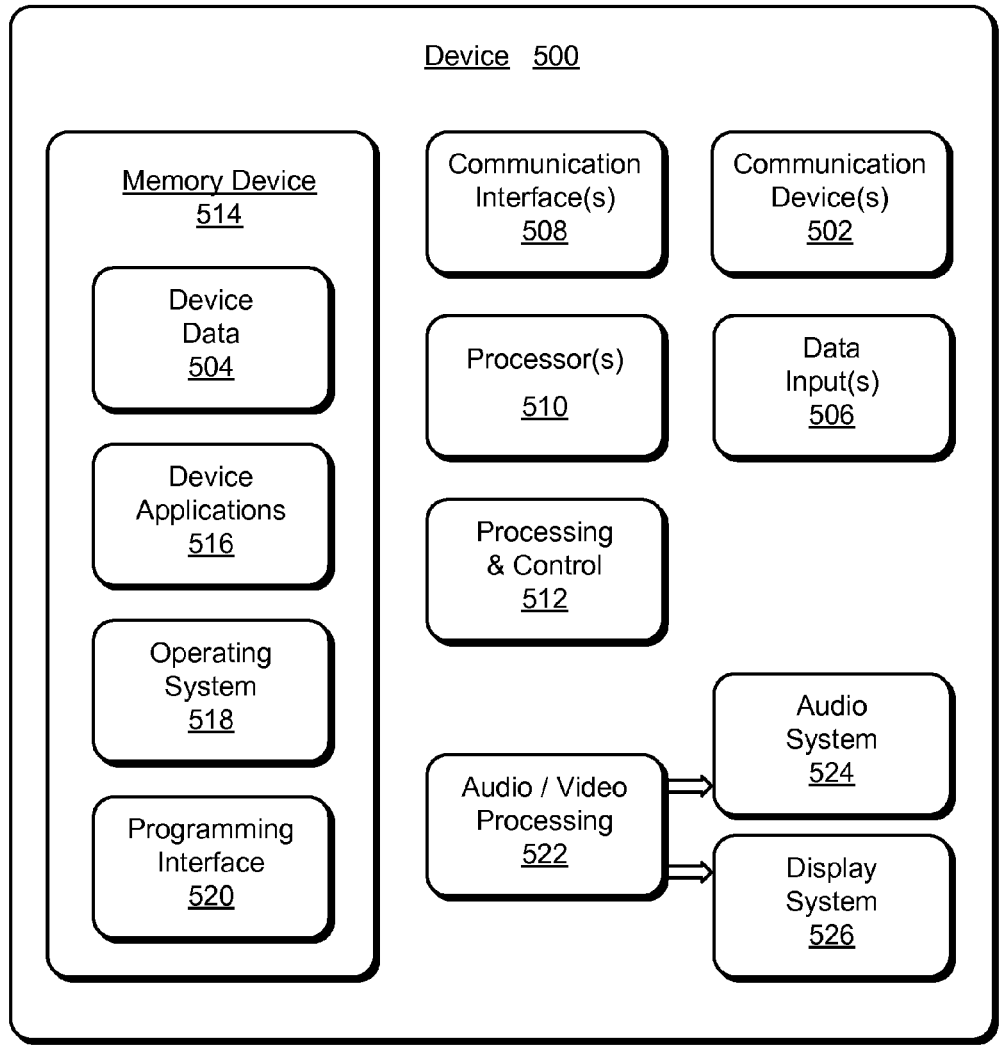
FIG. 5 illustrates various components of an example device that can implement embodiments of a programming interface for data communications.

FIG. 5 illustrates various components of an example device 500 that can be implemented as any of the devices, or services implemented by devices, described with reference to the previous FIGS. 1-4. In embodiments, the device may be implemented as any one or combination of a fixed or mobile device, in any form of a consumer, computer, server, portable, user, communication, phone, navigation, television, appliance, gaming, media playback, and/or electronic device. The device may also be associated with a user (i.e., a person)

and/or an entity that operates the device such that a device describes logical devices that include users, software, firmware, hardware, and/or a combination of devices.

The device 500 includes communication devices 502 that enable wired and/or wireless communication of device data 504, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 506 via which any type of data, media content, and/or inputs can be received, such as user-selectable inputs, messages, communications, music, television content, recorded video content, and any other type of audio, video, and/or image data received from any content and/or data source.

The device 500 also includes communication interfaces 508, such as any one or more of a serial, parallel, network, or wireless interface. The communication interfaces provide a connection and/or communication links between the device and a network by which other electronic, computing, and communication devices communicate data with the device.

The device 500 includes one or more processors 510 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 512. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 500 also includes one or more memory devices (e.g., computer-readable storage media) 514 that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 514 provides data storage mechanisms to store the device data 504, other types of information and/or data, and various device applications 516. For example, an operating system 518 can be maintained as a software application with a memory device and executed on the processors. The device applications may also include a device manager, such as any form of a control application, software application, signal processing and control module, code that is native to a particular device, a hardware abstraction layer for a particular device, and so on. In this example, the device applications 516 include a programming interface 520 that is shown as a software module and/or computer application. Alternatively or in addition, the programming interface can be implemented as hardware, software, firmware, fixed logic, or any combination thereof.

The device 500 also includes an audio and/or video processing system 522 that generates audio data for an audio system 524 and/or generates display data for a display system 526. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of a programming interface for data communications have been described in language specific to features and/or methods, the subject of the appended claims is not necessarily limited to the specific features or methods described. Rather, the specific features and methods are disclosed as example implementations of a programming interface for data communications.

The invention claimed is:

1. A computer-implemented method, comprising:
registering a user-mode virtual memory buffer corresponding to an application;
issuing a system call to a kernel for a kernel-mode execution thread to handle a request from the application;
allocating a completion queue from the user-mode virtual memory buffer and pinning the completion queue to physical memory;
mapping the completion queue to a first kernel-mode system address in the kernel, the completion queue configured to receive completion notifications from the kernel mode execution thread via the kernel-mode system address and to enable access to the completion notifications by the application via the user-mode virtual memory buffer;
registering a socket configured to provide data requests from the application to the kernel, the registering the socket comprising:
    allocating a request queue from the user-mode virtual memory buffer and pinning the request queue to the physical memory;
    mapping the request queue to a second kernel-mode system address, the request queue configured to receive data from the application via the user-mode virtual memory buffer and to enable access to the data by the kernel-mode execution thread via the second kernel-mode system address;

identifying the completion queue to the socket; and receiving an additional request from the application for the kernel-mode execution thread to handle additional data in the request queue, the kernel-mode execution thread handling the additional request without an additional system call being issued to the kernel.

2. A computer-implemented method as recited in claim 1, wherein the registering the user-mode virtual memory buffer further comprises sending a registration identifier of the buffer to the application.

3. A computer-implemented method as recited in claim 2, wherein the registering the user-mode virtual memory buffer comprises receiving a request from the application for the kernel to handle the data in the request queue, the request including the registration identifier of the buffer.

4. A computer-implemented method as recited in claim 3, wherein the kernel-mode execution thread is configured to handle the request by retrieving the data from the request queue via the second kernel-mode system address.

5. A computer-implemented method as recited in claim 3, further comprising receiving a completion notification in the completion queue, the completion notification posted in the completion queue by the kernel-mode execution thread via the kernel-mode virtual memory buffer when the request is handled.

6. A computer-implemented method as recited in claim 5, wherein the application is configured for:

monitoring the completion queue via the user-mode virtual memory buffer to detect the completion notification posted by the kernel-mode execution thread, the completion notification indicating to the application that the request has been handled by the kernel-mode execution thread; and re-using the request queue for an additional request responsive to detecting the completion notification.

7. A computing system, comprising:

a memory configured to maintain an application that is executable;

a processor to execute a programming interface that is configured to:

receive a request from the application for a kernel to handle data in a request queue, the request queue allocated from a user-mode virtual memory buffer corresponding to the application;

determine that a kernel-mode execution thread is not assigned to handle the request; and issue a system call to the kernel for a kernel-mode execution thread to handle the request, the kernel-mode execution thread further configured to handle additional requests from the application without the programming interface having to issue additional system calls to the kernel.

8. A computing system as recited in claim 7, wherein prior to receiving the request from the application, the programming interface is further configured to:

allocate the request queue and a completion queue from the user-mode virtual memory buffer corresponding to the application;

pin the request queue and the completion queue to physical memory; and map the request queue to a first kernel-mode system address and map the completion queue to a second kernel-mode system address to enable the request queue and the completion queue to be accessed by the kernel-mode execution thread.

9. A computing system as recited in claim 8, wherein the kernel-mode execution thread is configured to handle the request from the application by retrieving the data from the request queue via the first kernel-mode system address.

10. A computing system as recited in claim 8, wherein the completion queue is configured to receive a completion notification from the kernel-mode execution thread after the kernel-mode execution thread handles the request.

11. A computing system as recited in claim 10, wherein the application is configured to:

monitor the completion queue via the user-mode virtual memory buffer to detect the completion notification posted by the kernel-mode execution thread, the completion notification indicating to the application that the request has been handled by the kernel-mode execution thread; and re-use the request queue for the additional requests responsive to detecting the completion notification.

12. A computing system as recited in claim 11, wherein the application is further configured to re-use the request queue for the additional requests without unpinning the request queue and the completion queue from the physical memory.

13. A computing device, comprising:

at least a memory and a processor to implement a programming interface, the programming interface configured to:

allocate a request queue and a completion queue from a user-mode virtual memory buffer that corresponds to an application;

pin the request queue and the completion queue to physical memory;

map the request queue and the completion queue to kernel-mode system addresses in a kernel to enable the request queue and the completion queue to be accessed by a kernel-mode execution thread;

receive a request from the application for the kernel to handle data in the request queue;

issue a system call to the kernel for a kernel-mode execution thread to handle the request, the kernel-mode execution thread further configured to handle additional requests from the application; and receive the additional requests from the application for the kernel-mode execution thread to handle the data in the request queue, the kernel-mode execution thread configured to handle the additional requests without the programming interface issuing additional system calls.

14. A computing device as recited in claim 13, wherein the completion queue is configured to receive a completion notification from the kernel-mode execution thread after the kernel-mode execution thread handles the request.

15. A computing device as recited in claim 14, wherein the application is configured to:

monitor the completion queue to detect the completion notification posted by the kernel-mode execution thread, the completion notification indicating to the application that the request has been handled by the kernel-mode execution thread; and re-use the request queue for the additional requests.

16. A computing device as recited in claim 15, wherein the application is further configured to re-use the request queue for the additional requests without unpinning the request queue and the completion queue from the physical memory.

* * * * *